June 28, 1927.  
V. JERECZEK  
1,633,746  
CHAIN WHEEL FOR CHAIN TRACK DRIVES  
Filed Feb. 24, 1927

Inventor:  
Viktor Jereczek  
by B. Singer  
Attorney.

Patented June 28, 1927.

1,633,746

UNITED STATES PATENT OFFICE.

VIKTOR JERECZEK, OF WEISSENSEE, NEAR BERLIN, GERMANY, ASSIGNOR TO STOCK MOTORPFLUG AKTIENGESELLSCHAFT, OF BERLIN, GERMANY, A CORPORATION OF GERMANY.

CHAIN WHEEL FOR CHAIN-TRACK DRIVES.

Application filed February 24, 1927, Serial No. 170,672, and in Germany December 17, 1925.

My invention relates to a chain wheel for vehicles with chain track drive. In motor vehicles of this kind, as is known these chains are subjected to very heavy stresses, which lead to rapid wearing of the links and therewith extension of the chains. There is therefore generally the danger that one of the teeth of the chain wheel comes below one of the pins of the chain, whereupon the chain breaks or in the most favourable cases runs off the chain wheel. These disadvantages have greatly hampered the driving of vehicles with chain track drives. In order to remove these disadvantages, according to the invention the teeth of the chain wheels are arranged to yield. If with this arrangement a tooth strikes a pin of the chain, it can move back into the circumference of the chain wheel, and if no other tooth has come into engagement with a pin of the chain it can slide along beneath the pin concerned and come into engagement with the next pin. By a suitable choice of tooth pitch with respect to the chain pitch it may be attained that at least one tooth comes into engagement after traversing a short distance.

In order to be able to take up the necessarily large forces, the teeth are advantageously constructed as pivotal catches acted upon by resilient means.

In the drawing the chain wheel according to the invention is shown in one constructional form by way of example.

Figure 1:
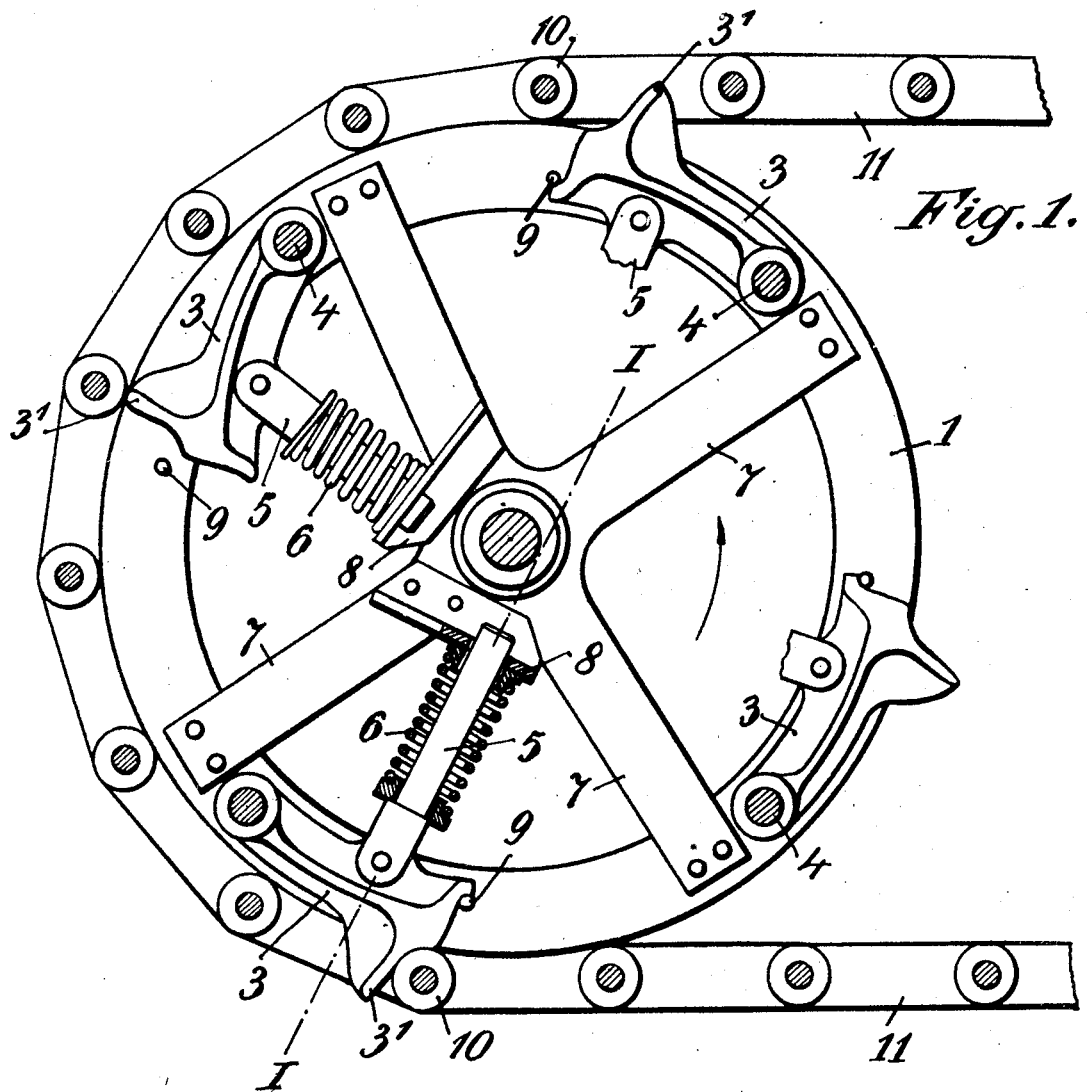
Fig. 1 is a vertical central section.
Figure 2:
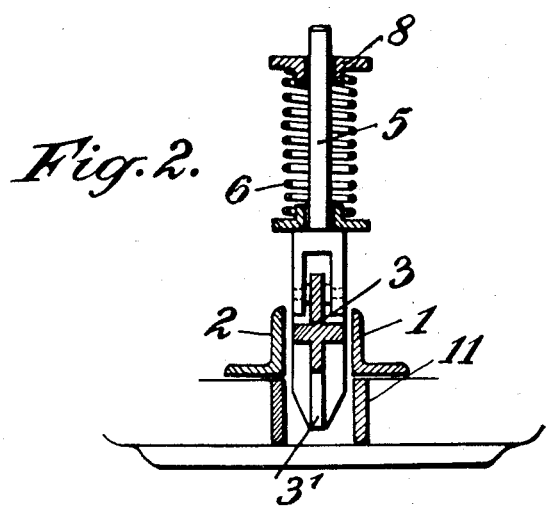
Fig. 2 is a section on line I—I of Fig. 1.

The chain wheel consists of two rim rings 1, 2, rigidly connected together in spaced relation and, between which one-armed levers 3 are pivotally arranged on pins 4 which connect the rim rings. To each lever 3 is pivotally connected a guide rod 5 which stands under the action of a spring 6 and the inner end of which is guided in a plate 8 secured on the spoke 7 of the wheel.

Each lever 3 is provided with a tooth-shaped projection $3^1$ and is normally pressed outwardly by the spring 6 so far that the tooth $3^1$ projects beyond the circumference of the rings 1, 2 of the wheel rim. The outward movement of each tooth is limited by the abutment pins 9 arranged between the rings 1, 2. Under normal conditions, upon rotation of the wheel in the direction of the arrow, the teeth place themselves in the usual manner against the pins 10 of the chain 11 and take this along with them. If however, as a result of extension of the chain track upon running in the chain a tooth $3^1$ comes below a chain pin 10, the tooth moves back between the rings 1, 2 against the action of spring 6. If with the constructional example indicated in Fig. 1 the lower driving tooth $3^1$ of the wheel fouls the chain 11, then the chain wheel slides further just so much that the upper tooth $3^1$ comes into abutment with the next chain pin 10 and takes over the further movement of the chain. The tooth on the left hand side of the wheel below a chain pin thereupon comes free of the pin and is pressed outwardly by the spring 6. It can accordingly come into action itself if the tooth which is driving at the time is pressed inwardly by some resistance. By a suitable choice of pitch the distance of sliding which a tooth has to traverse until its abutment against the next chain pin may be reduced to a minimum.

I claim:

1. In a driving toothed wheel, in combination, a wheel rim, a number of peripherally spaced lever arms pivotally connected to said rim, movable in the diametric plane of the wheel, and each provided with a driving tooth, radially arranged guide rods movably mounted on the wheel and each connected to one of the lever arms, and springs active to hold the lever arms in engaging position.

2. In a driving toothed wheel, the combination of a rim comprising a pair of spaced members, a number of peripherally spaced lever arms arranged between said rim members, pins connecting said rim members and on which said lever arms are spaced, spokes extending to said rim members, plates on said spokes, guide rods slidably mounted in said plates and pivotally connected at their outer ends to said lever arms, and coiled springs arranged around the guide rods and exerting their thrust against said plates and said rods to move the latter and the said lever arms radially outward.

In testimony whereof I have affixed my signature.

VIKTOR JERECZEK.